US008055754B2

(12) United States Patent
Scheering

(10) Patent No.: US 8,055,754 B2
(45) Date of Patent: Nov. 8, 2011

(54) VERIFICATION OF THE AVAILABILITY OF A SERVER

(75) Inventor: Christian Scheering, Bielefeld (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 371 days.

(21) Appl. No.: 10/574,169

(22) PCT Filed: Sep. 14, 2004

(86) PCT No.: PCT/EP2004/052163
§ 371 (c)(1), (2), (4) Date: Mar. 29, 2006

(87) PCT Pub. No.: WO2005/032094
PCT Pub. Date: Apr. 7, 2005

(65) Prior Publication Data
US 2007/0043850 A1      Feb. 22, 2007

(30) Foreign Application Priority Data
Sep. 30, 2003   (DE) ................................. 103 45 535

(51) Int. Cl.
G06F 15/173 (2006.01)
G06F 15/177 (2006.01)
(52) U.S. Cl. .................... 709/224; 709/221; 370/252
(58) Field of Classification Search ............. 709/203
See application file for complete search history.

(56) References Cited

U.S. PATENT DOCUMENTS

| | | | | |
|---|---|---|---|---|
| 5,553,239 A * | 9/1996 | Heath et al. | ...................... | 726/2 |
| 5,713,017 A * | 1/1998 | Lin et al. | ........................ | 707/8 |
| 5,761,507 A * | 6/1998 | Govett | ........................ | 718/101 |
| 6,041,343 A * | 3/2000 | Nguyen et al. | .................. | 709/203 |
| 6,078,943 A * | 6/2000 | Yu | ............................... | 718/105 |
| 6,108,699 A * | 8/2000 | Moiin | ........................ | 709/221 |
| 6,163,855 A * | 12/2000 | Shrivastava et al. | ............ | 714/4 |
| 6,212,175 B1 | 4/2001 | Harsch | | |
| 6,343,065 B1 * | 1/2002 | Serbest et al. | ............... | 370/230 |
| 6,343,330 B1 * | 1/2002 | Khanna et al. | ............... | 709/249 |
| 6,574,197 B1 * | 6/2003 | Kanamaru et al. | .......... | 370/252 |
| 7,062,480 B2 * | 6/2006 | Fay et al. | ...................... | 707/688 |
| 2001/0054158 A1 | 12/2001 | Jarosz | | |
| 2002/0129150 A1 * | 9/2002 | Jung | ............................ | 709/227 |
| 2002/0165964 A1 * | 11/2002 | Chen et al. | .................. | 709/226 |
| 2003/0072271 A1 * | 4/2003 | Simmons et al. | ............ | 370/255 |
| 2004/0111492 A1 * | 6/2004 | Nakahara et al. | ............ | 709/219 |
| 2006/0020686 A1 * | 1/2006 | Liss et al. | .................... | 709/219 |

OTHER PUBLICATIONS

Senthil Sengodan, "A Gatekeeper Discovery Mechanism for H.323 Systems", Proceedings of the SPIE, SPIE, Bellingham, VA, US, vol. 3528, Nov. 2, 1998, pp. 319-326, Abstract.

ITU-T International Telecommunication Union; Standard H. 225.0; "Series H: Audiovisual and Multimedia Systems—Infrastructure of audiovisual services—Transmission multiplexing and synchronization";"Call signalling protocols and media stream packetization for packet-based multimedia communication systems"; Nov. 2002; pp. i-vi and 1-206.

\* cited by examiner

*Primary Examiner* — Kevin Bates
*Assistant Examiner* — Joe Chacko

(57) ABSTRACT

According to the invention, an availability request is transmitted by a client to a server in order to verify whether a server is available. A response to said availability request is transmitted by the server to the client by means of a confirmation message if the server is available. The client transmits a message regarding the availability of the server to other clients who then prevent the transmission of an availability request to the server at least for a predefined period of time.

20 Claims, 3 Drawing Sheets

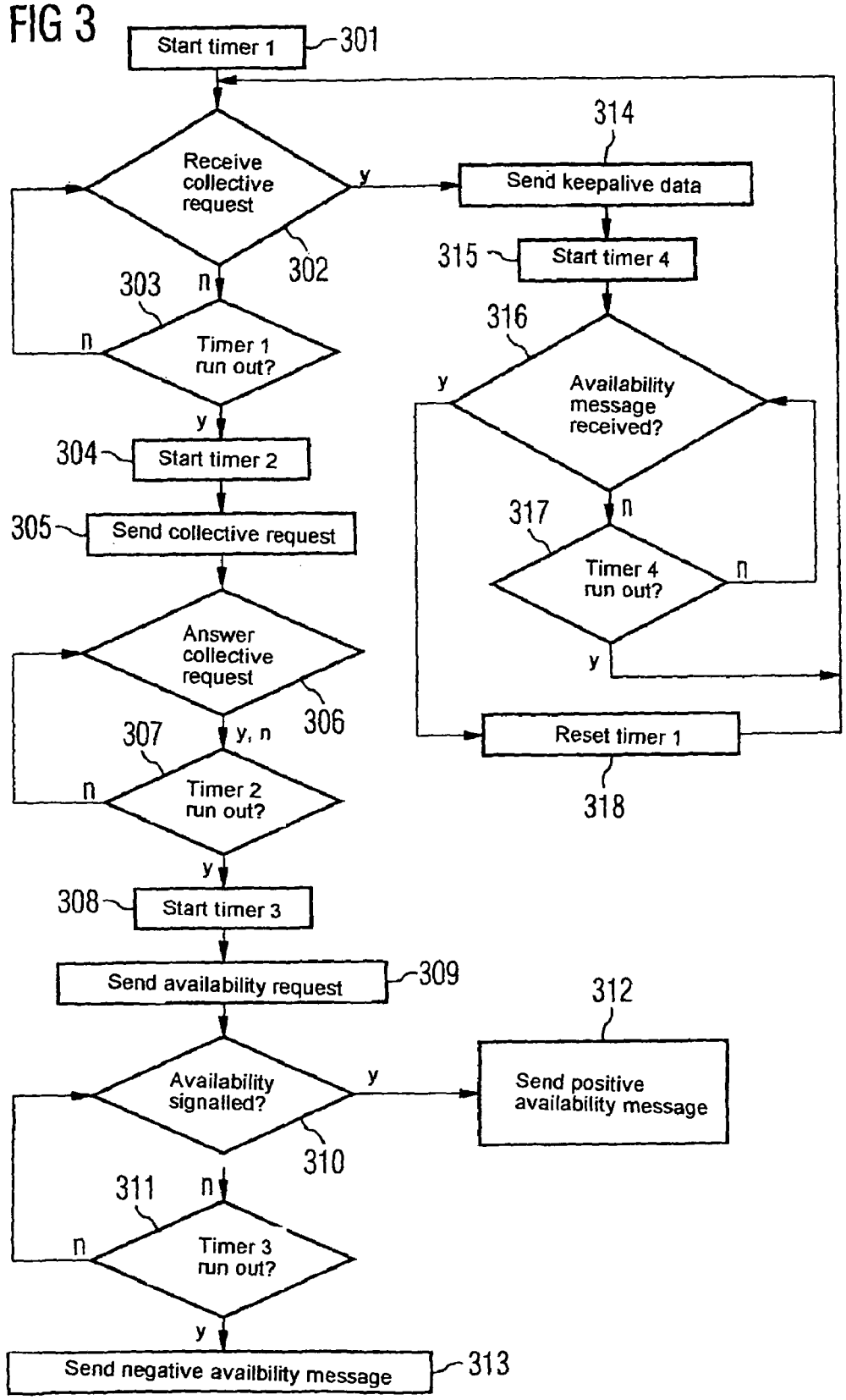

VERIFICATION OF THE AVAILABILITY OF A SERVER

CROSS REFERENCE TO RELATED APPLICATIONS

This application is the US National Stage of International Application No. PCT/EP2004/052163, filed Sep. 14, 2004 and claims the benefit thereof. The International Application claims the benefits of German application No. 10345535.3 filed Sep. 30, 2003, both of the applications are incorporated by reference herein in their entirety.

FIELD OF THE INVENTION

The present invention relates to a method for verifying the availability of a server, a control program and a client for a network providing connectionless services.

BACKGROUND OF THE INVENTION

Reliable verification of the availability of a server is of great significance in particular in the case of loosely connected client-server relations in packet-oriented data networks. If a client detects early enough that a server is overloaded or down, then it is possible to implement countermeasures in good time, such as, for example, the search for an alternative server or the creation of warning notices. Methods for verifying the availability of a server are applied, which methods also include keepalive tests described in the H.323 standard, as on 11/2000, chapter 7.2.2, if there is no permanent communication relationship between client and server and if, however, such a relationship must exist and be without fault is the basis for a desired functionality, for example, Internet telephony. In packet-oriented networks keepalive tests are used, for example, to simulate to the communication subscribers a quasi line-switching character with respect to mutual availability.

With conventional keepalive tests, a client sends availability requests to a selected server in cyclical intervals of time. If the server transmits a response to the availability request within a predefinable period of time, the server is deemed available and thus the communication relationship active. Of disadvantage in this approach is that the server is generally put under a severe load by transmitting a response to all the client requests.

SUMMARY OF THE INVENTION

The object underlying the invention is thus to specify a method for verifying the availability of a server, which method enables the load placed on the server by the availability requests directed at it to be minimized, as well as to specify technical implementations suitable for carrying out said method.

This object is achieved according to the invention by a method, a control program and a client with the features given in the claims. Advantageous developments of the present invention are set down in the dependent claims.

An essential aspect of the present invention consists in that a client, which has received a confirmation message from a server in response to an availability request directed to said server, transmits a message regarding the availability of the server to other clients. Whereupon the predefinable other clients prevent the transmission of an availability request to the server at least for a predefinable period of time. In this way, it is possible to considerably reduce the load placed on the server by availability requests, without this being at the cost of, for example, a server failure or a server overload no longer being detected in good time.

BRIEF DESCRIPTION OF THE DRAWINGS

The present invention is explained in greater detail below in an exemplary embodiment with reference to a drawing, in which.

DETAILED DESCRIPTION OF THE INVENTION

Figure 1:
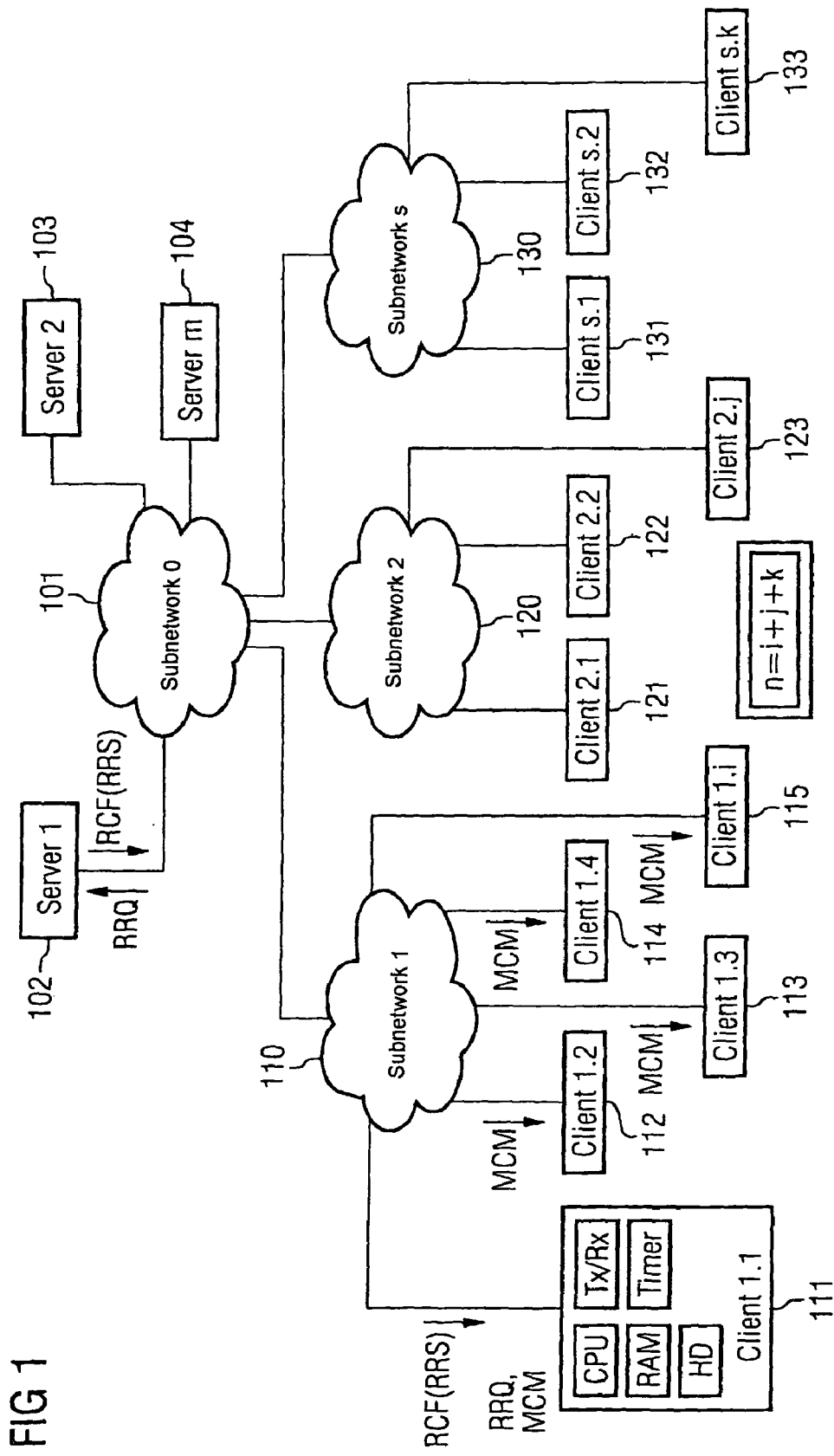
FIG. 1 shows an application environment of the present invention with a large number of clients and servers in a packet-oriented network with several subnetworks.

FIG. 1 displays a communication system that comprises a packet-oriented network with several subnetworks 101, 110, 120, 130, server 102 to 104 and several clients 111 to 115, 121 to 123, 131 to 133. The clients 111 to 115, 121 to 123, 131 to 133 use the services offered by the servers 102 to 104, for example, Internet telephony.

The subnetworks 110, 120, 130 are local subnetworks, each of which has a gatekeeper. The gatekeepers are used mainly for access control and address translation services. Servers in the packet-oriented network can assume this functionality of the gatekeeper.

The clients 111 to 115, 121 to 123, 131 to 133 first register with the respective server in order to use the services offered by a server 102 to 104. Thereby, a period of time is specified within which a registration is treated as valid. The sequence of a registration process is represented in model form and without any limitation of universal validity for client 111.

Client 111 has a central processing unit (CPU), a random access memory (RAM), a hard drive for non-volatile storage of data (HD), a network adaptor (Tx/Rx) and a timing unit (timer). The remaining clients 112 to 115, 121 to 123, 131 to 133 represented in FIG. 1 can also have such a structure and such a functionality.

In order to register with one of the servers 102 to 104, the client 111 transmits a message with a request to register RRQ with a server that provides a desired service. In the message with the request to register RRQ, there is a period of time specified within which period the registration of client 111 with the server selected must be valid. Outside this period of time, the registration of the client is considered invalid.

If it is available the selected server responds to the registration request with a message containing registration confirmation RCF. In the message with the registration confirmation RCF, a period of validity is also specified for the registration. The period of validity confirmed by the selected server either corresponds to the period of time specified by client 111 or is shorter than said period of time.

Within the period of validity for the registration, client 111 can direct availability requests to the selected server. Availability requests of this type, which are also called keepalive tests, are likewise transmitted to the selected server in the form of a message with a registration request RRQ. A message with a registration request RRQ sent in the course of a keepalive test has, compared to the usual messages with a registration request, a set keepalive bit.

In accordance with the ITU-T recommendations H.225.0, as on 11/2000, chapter 7.9, a shortened message with a registration request is adequate for a "lightweight registration". Thereby the message with a registration request only has information about the client's registration and status transport address (RAS address), a set keepalive bit, an end point indicator for the client, a server or gatekeeper identifier, tokens for operations to be carried out and a period of validity for the registration.

A message with request to register RRQ, which is transmitted to the selected server during a keepalive tests, can also be used to extend the period of validity of the registration. However, this only applies if the message is received by the selected server within the period of validity of the registration. Therefore, messages und processing delays should be taken into consideration when a client is notifying the end of a period of validity. After the registration validity period has ended it is no longer sufficient to transmit a shortened message with a registration request as described above in order to renew the registration.

If the message with the registration confirmation RCF does not have any information as to the period of validity of the registration, this will be interpreted as indicating that the selected server does not support any keepalive mechanisms for availability requests. If clients receive such a message without information about a period of validity, they should prevent availability requests being transmitted to the respective server.

When the validity of a registration has expired, the selected server can send a message to the client in question with a corresponding indication in order to inform said client that the period of validity has expired. This is of particular advantage when there is a loss of synchronization between the control units at the client on the one hand and at the server on the other.

If, after the period of validity of the registration has ended, client 111 transmits an above described shortened message with registration request RRQ and set keepalive bit to the selected server, then the server will respond with a message with registration rejection RRJ. A reason for rejection can also be included in such a message.

In order to avoid loading a server 102 to 104 unnecessarily with availability requests from clients 111 to 115, 121 to 123, 131 to 133, a client that has received a positive or a negative response to an availability request, uses a multicast message MCM to inform all the clients within the same subnetwork 110, 120, 130 of the availability of the respective server. In addition, a limitation on the same subnetwork allows problems with respect to generally unsolvable addresses to be avoided. In particular, unnecessary loading of the network with non-addressable messages is prevented.

Figure 2:
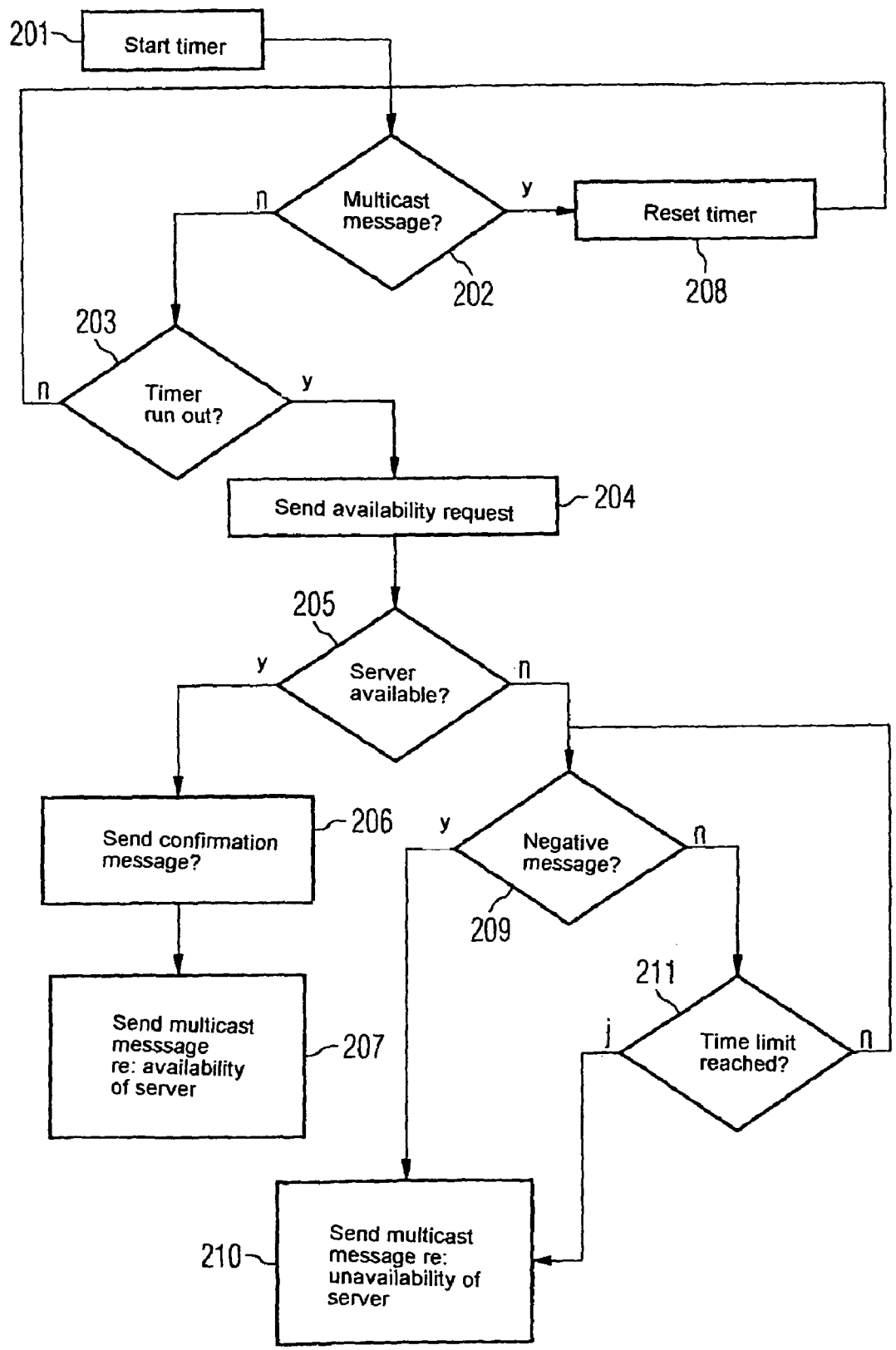
FIG. 2 shows a flow chart for a method for verifying the availability of a server, FIG. 3 a flow chart for, compared with FIG. 2, a modified method in which, in addition, the availability of clients is checked by the server.

The flow chart represented in FIG. 2 serves to further illustrate a method for verifying the availability of a server in a packet-oriented communications network. The starting point of the method is the start of a timer or of a counter of a timing unit of a client (step 201). Using the timer, times are set at which the client's availability request are to be transmitted to a selected server.

After the timer has started, the client monitors the reception of the multicast messages MCM, which provide statements as to the availability of a server (step 202). If the client receives such a multicast message, then the timer is reset (step 208). This thus prevents the transmission of availability requests to the selected server for a predefinable period of time.

Provided that no new multicast message was received, in addition a check is made whether the timer has run out and thus a time arrived at for delivering a new availability request (step 203). If the timer has not yet run out, then the reception of multicast messages and the progress of the timer continues to be checked. If the timer has run out, an availability request is sent to the selected server (step 204).

In step 205, the availability or unavailability of the selected server is determined at least implicitly. If the selected server is available, then said server responds to the availability request by sending a confirmation message to the requesting client (step 206). After having received the confirmation message, the requesting client informs all other clients within the same subnetwork about the availability of the selected server by means of a multicast message (step 207). The other clients who have received the multicast message, hereupon for their part prevent the transmission of availability requests to the selected server for a predefinable period of time.

As, when the selected server fails or is overloaded, no confirmation message regarding the availability of said server is sent, a check is made to determine whether the selected server is at least able to respond to the availability request with an unavailability message (step 209). If the selected server were overloaded, this would, for example, still be possible. By contrast, if the selected server fails, one can no longer expect an unavailability message to be sent. Therefore, a check is made to determine whether a time limit for the reception of a confirmation message or of an unavailability message has been reached (step 211). If this time limit is exceeded then the requesting client transmits a multicast message regarding the unavailability of the selected server to all clients within the same subnetwork (step 210). The same procedure is followed if the requesting client receives an unavailability message within the time limit allowed for a response to the availability request.

The method for verifying the availability of a server described is preferably implemented by means of a control program which can be loaded in a random access memory of a client and has at least one code section, on the implementation of which control program, the steps described above proceed to run—transmission of the availability request, monitoring of the receipt of a confirmation message, transmission of a message regarding the availability to other clients, monitoring the receipt of messages of other clients and if necessary preventing the sending of availability requests. By means of the control program, a client for a communications network that provides connectionless services is implemented, which client has a device for transmitting availability requests, a device for monitoring the receipt of confirmation messages, a device for transmitting messages regarding the availability of servers to other clients as well as a device for monitoring the receipt of messages of other clients and for preventing the transmission of availability requests.

The following observations serve to clarify the advantages of the described method for checking the availability of a server compared with conventional keepalive tests used up to now. According to the conventional keepalive tests used up to now a server with n=1000 clients sending availability requests and a request rate of a=3 requests per minute and client, and assuming such requests were equally distributed in time, would have to respond to an availability request every $$t_r(a=3, n=1000)=$$

Thus, the server would be busy answering an availability request in real time on average every 20 ms. This would result in a considerable load being placed on the server by availability requests, which would restrict it greatly in realizing the tasks which it was actually intended for. The first option to present itself for solving this problem would be to make a large reduction in the clients' request rates per minute, which would, however, result in the affected clients possibly determining the loss of the availability of the server far too late.

To assess one of the advantages that can be achieved with the method proposed here, it is first assumed that n clients are distributed on s subnetworks. It is further assumed that from each of these subnetworks at least one client will try to query the availability of the server. Each of these clients would then inform the remaining clients within its subnetwork by means of a multicast message regarding the availability of the server. Under ideal conditions, the number of availability requests to be processed by the server would correspond to the number s of subnetworks. In addition, it must also be taken into consideration that the multicast messages in the subnetworks could have a loss rate v between 0 and 100 percent. Thus the number $v_c$ of clients per subnetwork, which are not reached by a multicast message and hence themselves send an availability request to the server depending on the loss rate v of the multicast messages:

$$v_c =$$

The total number $v_c^{all}$ of all the clients who, under this condition, send an availability request to the server, can thus be estimated as follows:

$$v_c^{all} =$$

Assuming the above, the period of time $t_r$ between two availability requests sent to the server can be calculated as follows:

$$t_r(a,n,s,v) =$$

Using a numerical example, the load placed on the server by availability requests in the conventional keepalive tests up to now is compared with the load placed on the server in accordance with the method proposed here. With a request rate of a=3 availability requests per minute and n=1000 clients, the period of time $t_r$ between two availability requests is:

$$t_r(a=3,n=1000,s,v) =$$

Typical values for the loss rate v are clearly below 100 percent. With the above values for the request rate a, the number n of the clients and s=10 subnetworks, produces, in dependence on the loss rate v, the following efficiency increases $d_{eff}$ in percent in relation to the conventional keepalive tests with a period of time $t_r$=20 ms between two availability requests:

|  | V | | | | |
| --- | --- | --- | --- | --- | --- |
|  | 0.0 | 0.1 | 0.2 | 0.5 | 0.8 |
| $t_r$ [ms] | 2000 | 183 | 96 | 40 | 25 |
| d [%] | 9900 | 815 | 380 | 100 | 25 |

With a loss rate v=20% the mean time $t_r$ between two availability requests to be processed by the server is approximately 96 ms. This corresponds to an efficiency increase $d_{eff}$=380% compared with conventional keepalive tests up to now.

All in all, one can determine that, with the method proposed for checking the availability of the server, the load placed on the server by responding to availability requests clearly lessens, without this resulting in a significant increase in the time until the unavailability of the server is known to the clients. Moreover, in order to implement the method proposed here, changes are only necessary on the client side. The previous procedure for processing availability requests can be kept on the server side and thus does not require any further expenditure.

In the method represented in FIG. 3, a server also checks the availability of clients. This means that a server is also informed about the availability of clients who are only informed about the availability of the server by another client per multicast message and who do not themselves send keepalive requests directly to the server. First each client starts a first timer (timer 1) (step 301) and checks whether a multicast collective request has been received (step 302). A multicast collective request can be sent by a client as a sign that this client would like to carry out a collective keepalive test with a server, and that this client needs the keepalive data of other clients for this.

The status of the first timer is checked continuously by the respective client (step 303). If the first timer has not yet run out and no multicast collective request has been received, then the receipt of a multicast collective request continues to be monitored. If the first timer has run out and no multicast collective request has been received, then the respective client takes on the task of sending a multicast collective request to a selected server itself. To this end the respective requesting client starts a second timer (timer 2) (step 304) and transmits a multicast collective request to predefinable other clients (step 305). Subsequently, the respective requesting client checks whether the multicast collective request was responded to by the predefinable other clients (step 306), and whether the second timer has run out (step 307). If the second timer has not yet run out and no multicast collective request has been received, then the receipt of a response to the multicast collective request continues to be monitored.

After the second timer has run out, the respective requesting client starts a third timer (timer 3) (step 308) and sends a collective availability request to the selected server (step 309). The collective availability request includes data of the respective requesting client and of those predefinable other clients who responded to the multicast collective request of the respective requesting client until the second timer ran out. Subsequently the respective requesting client checks whether the selected server has signaled availability (step 310), and whether the third timer has run out (step 311). If the third timer has not yet run out and no response has been received to the collective availability request, then the receipt of a response to the collective availability request continues to be monitored.

If the selected server has signaled its availability to the respective requesting client, then the respective requesting client transmits a positive multicast availability message to the predefinable further clients (step 312). If the selected server has signaled its unavailability or has not sent any response to the collective availability request by the time the third timer has run out, then the respective requesting client transmits a negative multicast availability message to the predefinable other clients (step 313).

Predefinable other clients who have received a multicast collective request in accordance with the check in step 302, transmit their keepalive data to the respective requesting client (step 314), the receipt of which data the respective requesting client checks in accordance with 306. Subsequently, the predefinable other clients start a fourth timer (timer 4) (step 315) and check whether a positive or negative multicast availability message of the respective requesting client was received (step 316), and whether the fourth timer has run out (step 317). On receipt of a multicast availability message of the respective requesting client, the first timer is reset (step 318), so that the predefinable other clients do not send any availability requests to the selected server for a period of time determined by the first timer running out.

As long as the fourth timer has not run out, the predefinable other clients wait for a multicast availability message of the respective requesting client. If this does not occur before the fourth timer runs out, the respective client then itself assumes a role as the placer of a collective availability request in accordance with steps 304 to 313, provided the first timer has run out or no further multicast collective request has been received before said first timer has run out.

The application of the present invention is not limited to the exemplary embodiment described here.

The invention claimed is:

1. A method for verifying an availability of a server comprising:
   checking for a receipt of a message regarding a transmission of a server keepalive test by a first client within a first predetermined period of time;
   if no message regarding the transmission of the keepalive test is received by the first client within the first predetermined period of time, the first client transmitting a message regarding a collective request to a plurality of predefineable other clients;
   transmitting an availability request by the first client to the server, the availability request to the server comprising data of the predefineable other clients that responded to the message regarding the collective request within a second predetermined period of time;
   preventing transmission of any availability requests by the plurality of predefinable other clients to the server for at least a prescribable period of time; and
   after a third predetermined period of time or after receipt of a response to the availability request sent to the server, the first client transmitting a message regarding an availability of the server to the predefinable other clients that responded to the message regarding the collective requests within the second predetermined period of time.

2. The method of claim 1, wherein the method is used for verifying availability of the server in a packet-oriented communication network.

3. The method of claim 1, wherein data is transmitted between the server and the first client and the predefinable other clients by a connectionless switching control.

4. The method of claim 1, wherein the message regarding the availability of the server is transmitted by the first client to the plurality of predefinable other clients using a multicast message.

5. The method of claim 1, wherein the first client sends a message regarding an availability of the server to only the plurality of predefinable other clients within a same subnetwork.

6. The method of claim 1, wherein the first predetermined period of time is predefined by a first timer of the first client.

7. The method as claimed in claim 6, wherein the first timer is reset to a predefinable value after the response to the availability request is received by the first client.

8. The method of claim 1, further comprising the first client checking to determine whether the server is at least able to respond to the availability request with an unavailability message if no confirmation message is received by the first client.

9. The method of claim 1, wherein the message regarding the availability of the server is a negative availability message if the server provided an unavailability message or if the server did not respond to the availability request within the third predetermined period of time after the availability request was sent to the server.

10. The method of claim 1, further comprising the first client receiving keep alive data from the predefinable other clients.

11. The method of claim 1, further comprising one of the predefinable other clients transmitting a collective availability request to the server if no message regarding the collective request was received by that client within a predefined time period.

12. The method of claim 1, further comprising the first client storing keep alive data received from the predefinable other clients.

13. The method as claimed in claim 1 further comprising the first client checking for responses to the message regarding the collective request from the predefineable other clients within the second predetermined period of time.

14. The method as claimed in claim 1 wherein the message regarding the transmission of the server keepalive test is a multicast collective request from a client that intends to directly send a keepalive request to the server.

15. The method of claim 1 wherein the preventing of the transmission of any availability requests by the plurality of predefinable other clients to the server for at least the prescribable period of time is comprised of the predefineable other clients that responded to the message regarding the collective request within the second predetermined period of time checking whether the message regarding the availability of the server is received from the first client within a fourth predetermined period of time.

16. A control program loaded into a random access non-transitory memory of a client and having code comprising:
   a first code portion causing the client to check for a receipt of a message regarding a transmission of a server keepalive test by a first client within a first predetermined period of time;
   a second code portion configured such that, if no message from the server regarding the transmission of the keepalive test is received by the client within the first predetermined period of time, the client transmits a message regarding a collective request to a plurality of predefineable other clients;
   a third code portion configured to transmit an availability request to a server;
   a fourth code portion configured to monitor for receipt of a response comprising a confirmation message responding to the availability request if the server is available; and
   a fifth code portion configured to transmit a message regarding an availability of the server to a plurality of predefinable other clients, the message regarding the availability of the server configured to prevent a transmission of an availability request by any of the predefinable other clients to the server for a predefinable period of time if the confirmation message responding to the availability request is detected by a second device.

17. A client of a communication network comprising:
   non-transitory memory having a control program, the control program defining:
   a first device causing the client to check for a receipt of a message regarding a transmission of a server keepalive test by a first client within a first predetermined period of time;
   a second device configured such that, if no message from the server regarding the transmission of the keepalive test is received by the client within the first predetermined period of time, the client transmits a message regarding a collective request to a plurality of predefineable other clients;

a third device configured to transmit an availability request to a server;
a fourth device configured to monitor for receipt of a response comprising a confirmation message responding to the availability request if the server is available; and
a fifth device configured to transmit a message regarding an availability of the server to the plurality of predefinable other clients, the message regarding the availability of the server configured to prevent a transmission of an availability request by any of the predefinable other clients to the server for a predefinable period of time if the confirmation message responding to the availability request is detected by the second device.

18. The client of claim 17 wherein the control program also defines another device configured to store keep alive data received from the predefinable other clients.

19. The client of claim 17 wherein the message regarding the availability of the server is a negative multicast availability message if the availability message is not received from the server within a predetermined time period after the availability request is sent to the server.

20. The client of claim 17 wherein the first device comprises a transmission mechanism.

* * * * *